United States Patent
McGann et al.

[11] 3,950,071
[45] Apr. 13, 1976

[54] MULTIPLE STAB ELECTRICAL CONNECTOR

[75] Inventors: James Edward McGann; Rodney Laban Naas, both of Plainville, Conn.

[73] Assignee: General Electric Company, New York, N.Y.

[22] Filed: Nov. 11, 1974

[21] Appl. No.: 522,772

[52] U.S. Cl. ............................................ 339/258 F
[51] Int. Cl.² ........................................ H01R 11/22
[58] Field of Search......... 339/253 F, 258 R, 258 C, 339/258 F, 258 P, 258 TC, 259 R, 259 F

[56] References Cited
UNITED STATES PATENTS

| | | | |
|---|---|---|---|
| 2,068,314 | 1/1937 | Dotterer | 339/258 R X |
| 2,659,063 | 11/1953 | Webb et al. | 339/253 F |
| 2,943,295 | 6/1960 | Stewart | 339/258 F |
| 3,369,210 | 2/1968 | Menickella | 339/258 R X |
| 3,706,960 | 12/1972 | Grenda | 339/258 R |
| 3,718,895 | 2/1973 | Reynolds et al. | 339/258 R |

Primary Examiner—Joseph H. McGlynn
Assistant Examiner—Howard N. Goldberg
Attorney, Agent, or Firm—Robert A. Cahill; Walter C. Bernkopf; Frank L. Neuhauser

[57] ABSTRACT

A multiple stab connector for implementation in plug-in circuit breaker load centers, wherein the stab is formed from a single blank of conductive sheet metal stock, with sections of the stab stacked together for structural rigidity and enhanced current carrying capacity.

12 Claims, 4 Drawing Figures

MULTIPLE STAB ELECTRICAL CONNECTOR

BACKGROUND OF THE INVENTION

The present invention is directed to an improved multiple stab connector having particular, but not necessarily limited application to plug-in circuit breaker load centers. Heretofore, a multiple stab connector adapted for plug-on engagement by plural circuit breakers has typically been fabricated from several conductive parts staked and soldered together. An example of such a multi-part multiple stab connector is disclosed in U.S. Pat. No. 3,404,315, issued to Jacobs, et al and assigned to the assignee of the instant application. One stab connector embodiment shown in this patent has a main contact blade and two pairs of wing contact blades. A full-width circuit breaker can be stabbed on each end portion of the main contact blade or a total of four half-width circuit breakers can be stabbed on the wing contact blades, assuming the contact jaws of the circuit breakers are appropriately designed. Alternatively, one full-width and two half-width circuit breakers can be accommodated by this stab configuration. Considering the stab connector embodiment of FIG. 7, of U.S. Pat. No. 3,404,315, a U-shaped part providing the four wing contact blades is staked to an L-shaped part with its upright portion providing the main contact blade and its horizontal portion serving as a base facilitating electrical connection and physical mounting to an underlying busbar. To insure adequate electrical conductivity between parts, the seams therebetween are bridged by solder. It has been found that the stab connector of this patent cannot pass heat tests unless made from reasonably heavy stock. This is due largely to the fact that the cutout in the L-shaped part necessary to accommodate the U-shaped part leaves only relatively narrow webs to carry the current between the contact blades and the base. These webs must have sufficient cross-sections to conduct rated current without undue heat-rise, as well as the requisite strength to physically support the contact blades. Moreover, this two part construction requires multiple blanking and forming operations, an assembly operation and a soldering operation in order to create a multiple stab connector having the requisite performance characteristics.

It is accordingly an object of the present invention to provide an improved multiple stab connector.

An additional object is to provide a multiple stab connector of the above character which requires less material than equivalent prior art connectors.

Still another object is to provide a multiple stab connector of the above character which is simpler and less expensive to manufacture than equivalent prior connectors.

Other objects of the invention will become apparent from the following detailed description and appended claims.

SUMMARY OF THE INVENTION

In accordance with the present invention, there is provided an improved multiple stab connector for utilization in a panelboard or load center to accept plug-in electrical engagement with plural circuit interrupting devices, such as automatic electric circuit breakers. The subject stab connector provides multiple contact blades, each capable of accepting the contact jaws of a circuit breaker line terminal. By virtue of the relative positions and orientations of the various contact blades, the stab connector of the invention can accept two full-width circuit breakers or four half-width circuit breakers, assuming their contact jaws are appropriately designed. As a third option the instant stab connector can accept one full-width and two half-width circuit breakers. It will be appreciated that the benefits of the present invention are achieved in a truncated stab connector having less than a full complement of contact blades.

More specifically, as a signal feature of the present invention, a multiple stab connector is provided in a one-piece construction formed from a single sheet metal blank. This both simplifies and reduces the cost of manufacture. Blanking can be achieved in a single operation and the assembly step required by multi-part constructions is avoided. Moreover, the soldering operation to improve the electrical conductivity between parts is obviated. It is also found that the one-piece construction of the present invention achieves the requisite current carrying capacity with a reduced material thickness — by as much as one-third — thus affording additional cost savings.

The single blank, from which the multiple stab connector of the present invention is formed, comprises a base and a body section extending longitudinally therefrom. A main contact blade is formed in the terminal end portion of the body section remote from the base. Wing sections extend transversely from opposed sides of the base. The extremity of each wing section is configured to provide two longitudinally spaced wing contact blades. Additional transverse extensions in the form of short tangs project from opposed sides of the body section.

To form the multiple stab from this single blank, the body section is bent away from the plane of the base about its junction therewith to orient the main contact blade at an angular disposition of 90° relative to the base portion. The wing sections are then bent away from the plane of the base about their junctions therewith to dispose the wing contact blades at right angles both to the main contact blade and the base. The tangs enter pre-formed apertures in the wing sections and are subsequently staked over to structurally rigidify the connector and maintain the established positional relationships of the various contact blades. The staking also electrically interconnects the body and wing sections to provide multiple shunt current paths between the various contact blades and the base.

In one application, the multiple stab connector of the invention is clamped to an underlying busbar by a bolt passed through a preformed hole in the base. As an additional feature of the invention, the base portion is originally formed slightly dished and is flattened out as the bolt is turned tight to thereby enhance the intimacy and area of contact of the base undersurface with the busbar. Hardening the upper surface of the base portion, such as by coining a knurl therein, is found to enhance overall surface contact pressure and to reduce the tendency of the marginal portions of the base to curl away from the busbar as the clamping bolt is tightened down.

The invention accordingly comprises the features of construction, combinations of elements and arrangements of parts, together with a method of manufacture including a series of method steps, all of which will be exemplified in the construction and method hereinafter set forth, and the scope of the invention will be indicated in the claims.

BRIEF DESCRIPTION OF THE DRAWINGS

For a better understanding of the nature and objects of the invention reference should be had to the following detailed description taken in connection with the accompanying drawings, in which.

Like reference numerals refer to corresponding parts throughout the several views of the drawings.

DETAILED DESCRIPTION

Figure 1:
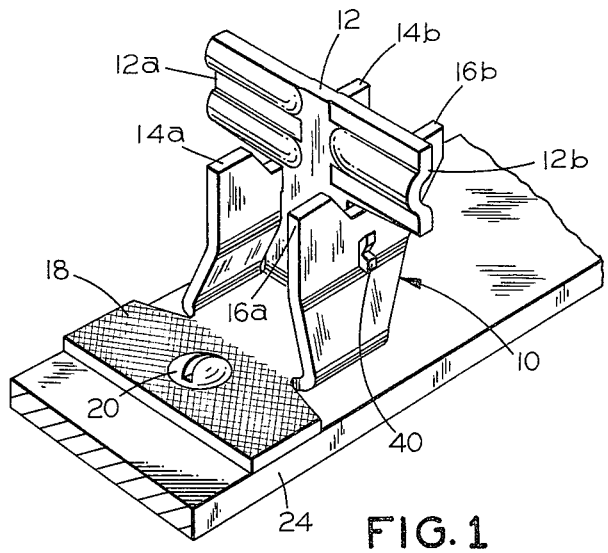
FIG. 1 is a perspective view of a multiple stab connector constructed in accordance with the present invention.
Figure 2:
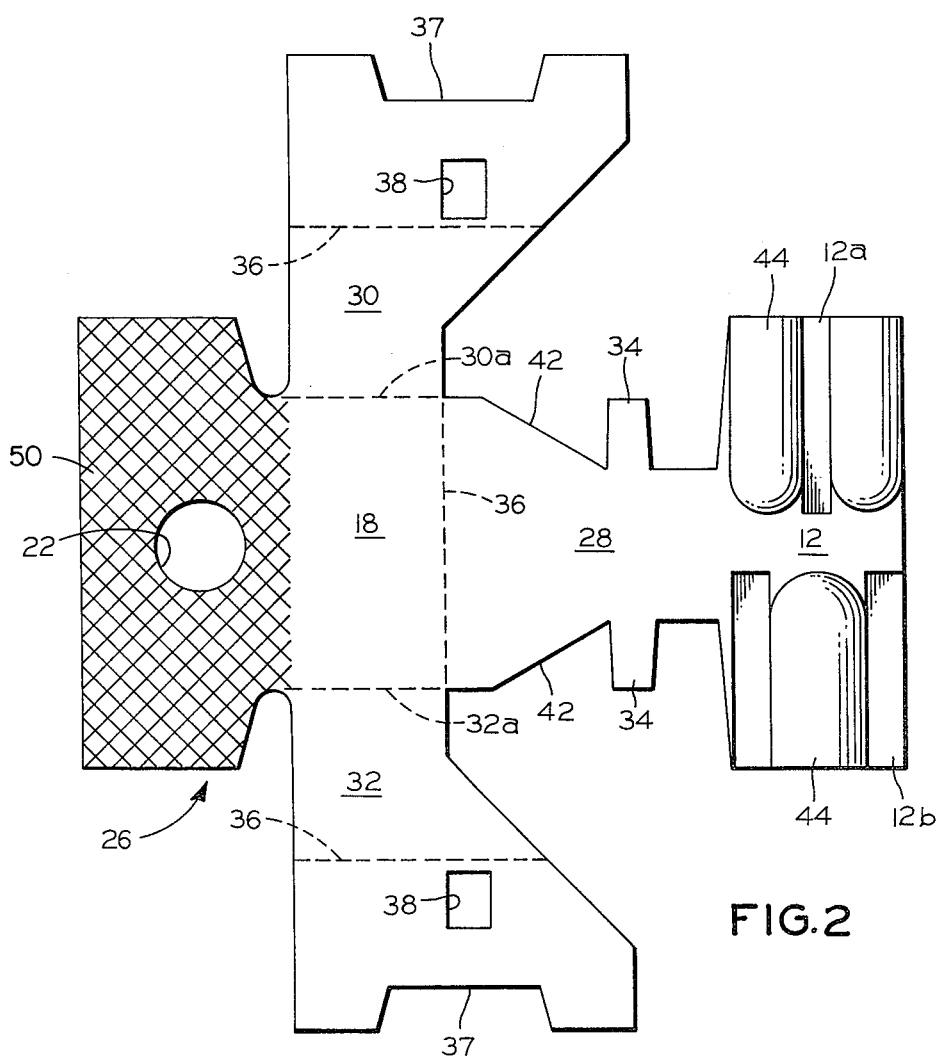
FIG. 2 is a plan view of a blank from which the stab connector of FIG. 1 is formed.
Figure 3:
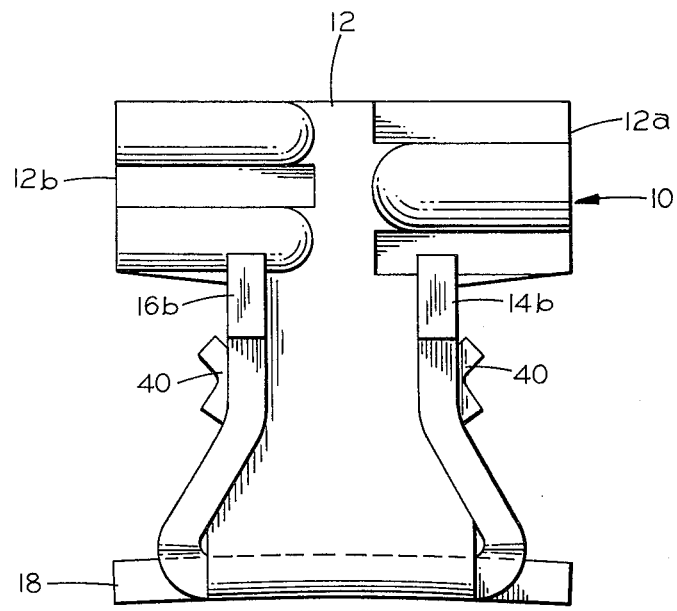
FIG. 3 is an end elevational view of the stab connector of FIG. 1.
Figure 4:
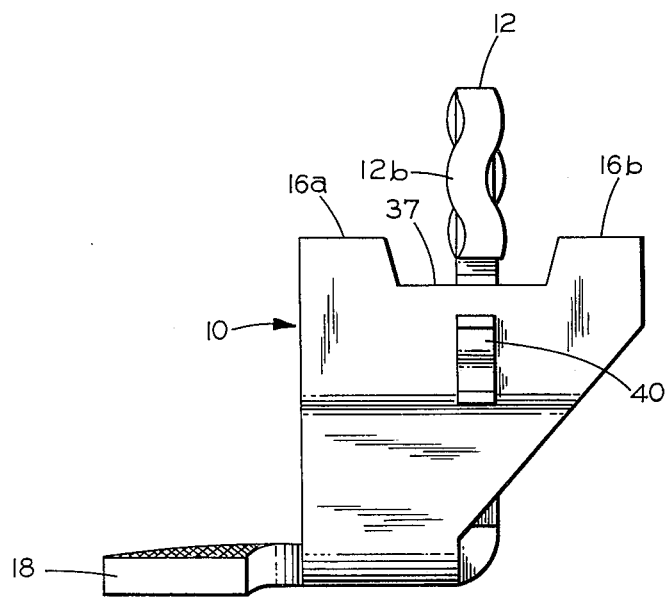
FIG. 4 is a side elevational view of the stab connector of FIG. 1.

The multiple stab connector of the instant invention, generally indicated at 10 in FIGS. 1, 3 and 4, includes a main contact blade 12 and two pairs of wing contact blades 14a, 14b, 16a, 16b, all integrally formed with and upstanding from a base 18. The connector 10 is installed in a panelboard or load center by a bolt 20 passing through a hole 22 in base 18 (FIG. 2) and threaded into a tapped bore (not shown) in a busbar 24 to clamp the base in electrical contacting engagement with the busbar. The physical arrangement of the various contact blades of connector 10 corresponds to that shown in the above-mentioned U.S. Pat. No. 3,404,315 and thus is capable of accepting two full-width circuit breakers plugged on the extremities 12a, 12b of the main contact blade 12. Alternatively, four half-width circuit breakers one plugged on each wing contact blade 14a, 14b, 16a, 16b, can be accepted. As a third alternative, a full-width circuit breaker can be plugged on one of the main blade contact extremities 12a, 12b and two half-width circuit breakers can be plugged on the exposed pair of wing contact blades 14a, 14b or 16a, 16b.

The multiple stab connector 10 is formed from a single blank, generally indicated at 26 in FIG. 2, which is, in turn, stamped from conductive sheet material, such as copper. The main contact blade 12 is formed at the terminal end of a body section 28 extending longitudinally from base 18. Wing sections 30 and 32, with the wing contact blades 14a, 14b and 16a, 16b, respectively, formed in their extremities, extend laterally or transversely from the base 18. A tang 34 extends laterally from each side of the body section 28.

To form the multiple stab connector 10 of FIG. 1, the body section 28 is first bent away from the plane of base 18 about the junction therebetween, indicated at 36. As seen in FIG. 4, the body section including the main contact blade assumes a stance at essentially right angles to the base. The wing sections 30 and 32 are then bent away from the plane of base 18 about their respective junctions 30a and 32a with the base. As seen in FIG. 3, the wing sections are bent such that their lower portions converge, each assuming, in the illustrated embodiment, an angle of approximately 60° relative to the base. The upper portion of each wing section is reverse bent about line 36 (FIG. 2) at an off-set angle of approximately 30° such that the wing contact blades are oriented in essentially transverse relation to the main contact blade and at 90° relative to the base. The terminal portions of the wing sections intermediate the contact blade pairs 14a, 14b and 16a, 16b are relieved, as indicated at 37, to clear the lower edges of the main contact blade extremities. The tangs 34 enter pre-formed rectangular apertures 38 punched in wing sections 30, 32 and are staked over as indicated at 40 in FIGS. 1 and 3, to rigidify the connector construction. Structural rigidity is further enhanced by the fact that the convergent portions of the wing sections seat against the sloping edge portions 42 of the body portion 28. This is particularly significant in service since the installation of circuit breakers on the wing contact blades results in forces tending to collapse the wing sections onto the base. Staking also electrically connects the wing sections to the body portion 28 to provide plural shunt current paths between the base 18 and the various contact blades.

The illustrated one-piece construction of the present invention provides sufficient conductive metal cross-section in the junctions 30a, 32a and 36 with the base 18 to conduct rated current from the busbar 24 to the various contact blades without undue heat rise. Consequently, the application of solder to the seams between the wing sections and the body portion 28 is rendered unnecessary. In fact, it is found that the multiple stab connector of the present invention does not "run hot" even when the conductive metal thickness is reduced by one-third, as compared to equivalent multi-part stab connectors used heretofore. To compensate for this thickness reduction the main contact blade 12 may be corrugated, as indicated at 44, so as to make good electrical contact with circuit breaker terminal jaws designed for previously thicker stab blades. Since the wing contact blades typically accommodate circuit breakers of lower current ratings whose terminal jaws are designed for thinner stab blades, corrugation of the wing contact blades 14a, 14b, 16a, 16b is not necessary. In prior multi-piece constructions, the material thicknesses of the pieces differed to reflect this difference in terminal jaw designs.

It will also be noted that the convergence of the lower portions of the wing sections, rather than a straight-sided configuration, serves to bring the wing contact blades to their requisite positions from relatively widely spaced base junctions 30a, 32a. Thus, junction 36 is elongated for increased current carrying capacity. Also, the material cross-section to each side of the bolt hole 22, where maximum contact pressure with busbar 24 is achieved, is increased to further enhance the current carrying capacity of stab connector 10.

As an additional feature of the present invention, the base 18 is formed in a slightly dished-shape, i.e., with its central portion adjacent bolt hole 22 bowed upwardly (FIG. 3). Thus, when bolt 20 is tightened down, base 18 is flattened out to provide a wider area of intimate electrical contact of the base undersurface with the busbar 24. The base upper surface surrounding bolt hole 22 is hardened to enhance overall surface contact pressure and to reduce the tendency of the marginal portions of the base to distort upwardly away from the busbar in response to the clamping pressure exerted by bolt 20. When the multiple stab connect 10 is made of copper, appropriate surface hardening can be obtained by coining a medium knurl, indicated at 50, in FIG. 2, in the base upper surface.

While the illustrated embodiment of the present invention provides, in effect, two main contact blades (blade extremities 12a and 12b) and four wing contact blades, it will be appreciated that the benefits of the invention can be obtained in a truncated stab configuration wherein one or more of these contact blades are eliminated. For example, one of the main contact blade extremities and/or one of the wing sections may be eliminated to provide a so-called "half-stab". While the present invention is illustrated in a center stab bolted directly to a busbar, it will be appreciated that the stab base 18 can be welded to a strap running to an outer busbar in the load center and thus have application as an outer stab.

It will thus be seen that the objectives set forth above, among those made apparent from the foregoing description, are efficiently attained and, since certain changes may be made in the above constructions or in the above described method steps without departing from the scope of the invention, it is intended that all matter contained in the above description or shown in the accompanying drawings shall be interpreted as illustrative and not in a limiting sense.

Having described our invention, what we claim as new and desire to secure by Letters Patent is:

1. A multiple stab electrical connector formed from a single electrically conductive sheet metal blank; said stab connector comprising, in combination:
   A. a base for electrical connection to a current carrying member;
   B. a rigid body section bent away from the plane of said base about the junction therebetween;
   C. a first contact blade formed in the terminal portion of said body section remote from said base, said first contact blade oriented at essentially right angles to said base;
   D. at least rigid one wing section bent away from the plane of said base about the junction therebetween;
   E. at least one second contact blade formed in the terminal portion of said wing section remote from said base, said second contact blade oriented at essentially right angles to said base; and
   F. means integrally formed with said body section and said wing section immovably mechanically interconnecting said sections at a point intermediate said contact blades and said base.

2. The multiple stab connector defined in claim 1, wherein the junction of said body section with said base is essentially at right angles to the junction of said wing section with said base.

3. The multiple stab connector defined in claim 1, wherein a pair of spaced second contact blades are formed in the terminal portion of said wing section remote from said base, said second contact blade pair oriented at essentially right angles to said base.

4. The multiple stab connector defined in claim 1, wherein said first and second contact blades are arranged at essentially right angles to each other.

5. The multiple stab connector defined in claim 1, wherein said mechanically interconnecting means comprises a tang extending laterally from said body section and an aperture formed in said wing section, said tang protruding through said aperture and having its termination staked over to mechanically interconnect said sections.

6. The multiple stab connector defined in claim 1, wherein a portion of said wing section adjacent its junction with said base assumes an angle of less than 90° relative to the plane of said base, and said body portion includes an angular edge segment arranged to provide underlying support for said portion of said wing section.

7. The multiple stab connector defined in claim 1, which includes a pair of opposed wing sections bent away from the plane of said base about their respective junctions with said base, each of said wing sections having a second contact blade formed in the terminal portion thereof remote from said base, and said mechanically interconnecting means is integrally formed with both said wing sections and said body section for interconnecting said wing sections and said body section at points intermediate said contact blades and said base.

8. The multiple stab connector defined in claim 7, wherein the junctions of said wing sections with said base are in spaced parallel relation and at essentially right angles to the junction of said body section with said base.

9. The multiple stab connector defined in claim 8, wherein opposed portions of said wing sections adjacent the junctions with said base are convergent, such that said second contact blades of respective wing sections are in more closely spaced, parallel relation than are the wing section junctions with said base, and said body section includes opposed angular edge segments arranged to provide underlying support for said convergent portions of said wing sections.

10. The multiple stab connector defined in claim 7, wherein said mechanically interconnecting means comprises opposed tangs extending laterally from said body section, and an aperture formed in each said wing section, said tangs protruding through said apertures and having their terminal portions staked over to mechanically interconnect said wing sections to said body section.

11. The multiple stab connector defined in claim 1, wherein said base is adapted for clamped surface-to-surface electrical contacting engagement with the current carrying member, said base formed slightly dish-shaped such that, when clamped to the member, said base is flattened out to thereby enhance the overall surface-to-surface contact with the member.

12. The multiple stab connector defined in claim 11, wherein the surface of said base opposite the surface for contacting the current carrying member is hardened.

* * * * *